United States Patent
Evans et al.

(10) Patent No.: US 11,909,668 B2
(45) Date of Patent: *Feb. 20, 2024

(54) PROGRAMMABLE PACKET DATA PROCESSING SYSTEM

(71) Applicant: METASWITCH NETWORKS LTD., Enfield (GB)

(72) Inventors: Michael Jeffrey Evans, Enfield (GB); Christian Dominic Lund, Enfiled (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,675

(22) Filed: Mar. 1, 2022

(65) Prior Publication Data

US 2022/0337533 A1  Oct. 20, 2022

Related U.S. Application Data

(63) Continuation of application No. 16/538,546, filed on Aug. 12, 2019, now Pat. No. 11,297,008.

(30) Foreign Application Priority Data

Aug. 13, 2018  (GB) .................................. 1813199

(51) Int. Cl.
*G06F 9/44* (2018.01)
*G06N 5/02* (2023.01)
*H04L 12/741* (2013.01)
*H04L 49/253* (2022.01)
*H04L 45/60* (2022.01)
*H04L 47/2441* (2022.01)
*H04L 69/22* (2022.01)

(52) U.S. Cl.
CPC ............ *H04L 49/254* (2013.01); *H04L 45/60* (2013.01); *H04L 47/2441* (2013.01); *H04L 69/22* (2013.01)

(58) Field of Classification Search
CPC . H04L 49/254; H04L 47/2441; H04L 47/787; H04L 45/60; H04L 47/781; H04L 69/22; H04L 45/30; H04L 41/0286; H04L 45/74; H04L 47/32; H04L 45/64; H04L 45/745; H04L 47/825; H04L 63/0236; H04L 67/16; H04L 67/51; G06F 8/35; G06F 8/41; G06N 5/02; H04W 48/08
USPC .......................................................... 370/235
See application file for complete search history.

(56) References Cited

U.S. PATENT DOCUMENTS

| | | | | |
|---|---|---|---|---|
| 6,985,722 B1* | 1/2006 | Snelgrove | ........... | H04M 7/0081 370/255 |
| 7,486,614 B2* | 2/2009 | Yu | ............................ | H04L 12/43 398/4 |
| 11,178,051 B2* | 11/2021 | Shelar | ...................... | H04L 45/56 |
| 2005/0060418 A1* | 3/2005 | Sorokopud | ............. | H04L 47/22 709/230 |
| 2013/0232104 A1* | 9/2013 | Goyal | ...................... | G06N 5/02 706/59 |

(Continued)

*Primary Examiner* — Edan Orgad
*Assistant Examiner* — Vanneilian Lalchinthang
(74) *Attorney, Agent, or Firm* — Han Gim; Newport IP, LLC (57) ABSTRACT

Embodiments of the present disclosure relate to software-defined networks, and particularly, but not exclusively to programmable packet data processing systems, methods and computer readable products for use therein.

20 Claims, 5 Drawing Sheets

(56) References Cited

U.S. PATENT DOCUMENTS

| | | | |
|---|---|---|---|
| 2015/0163159 A1* | 6/2015 | DeCusatis | H04L 47/805 |
| | | | 709/226 |
| 2016/0062746 A1* | 3/2016 | Chiosi | H04L 41/0895 |
| | | | 717/104 |
| 2016/0330076 A1* | 11/2016 | Tiwari | H04L 41/0806 |
| 2017/0371692 A1* | 12/2017 | Connolly | G06F 9/45558 |
| 2018/0121320 A1* | 5/2018 | Dolby | G06F 11/3604 |
| 2018/0150569 A1* | 5/2018 | Wechsler | G06F 16/212 |
| 2019/0007237 A1* | 1/2019 | Paramasivam | H04L 49/9005 |
| 2020/0028779 A1* | 1/2020 | Ni | H04L 67/51 |

* cited by examiner

PROGRAMMABLE PACKET DATA PROCESSING SYSTEM

CROSS-REFERENCE TO RELATED APPLICATIONS

This application claims priority to United Kingdom Application No. GB1813199.5, filed Aug. 13, 2018, under 35 U.S.C. § 119(a). The above referenced patent application is incorporated by reference in its entirety.

BACKGROUND OF THE INVENTION

Technical Field

Embodiments of the present disclosure relate to programmable packet data processing systems, and have particular, but not exclusive, application in software-defined networks.

Description of the Related Technology

There has been an increasing drive towards a flexible, response-based approach to controlling traffic flows within a network or the Internet. These drivers include the increasingly widespread use of server virtualization, where virtualization is used to mask physical server resources, including the number and identity of individual physical servers, processors, and operating systems, from server users. This makes it possible to transform a single physical machine into multiple, independent servers, conserving hardware resources.

However, server virtualization creates problems with traditional network architectures. For example, in the configuration of Virtual LANs (VLANs), network managers need to make sure the VLAN used by a virtual machine is assigned to the same switch port as the physical server running the virtual machine. It follows that whenever a virtual machine is reconfigured, it is necessary to reconfigure the VLAN. In general terms, to match the flexibility of server virtualization, the network manager needs to be able to dynamically add, drop, and change network resources and profiles. This process is difficult to do with conventional network equipment, in which the control logic for each switch is co-located with the switching logic, making it difficult to adjust the network infrastructure and operation to large-scale addition of end systems, virtual machines, and virtual networks.

The move to server virtualization has also had a knock-on effect on packet flows, since there can be considerable volumes of traffic among and between virtual servers, e.g. for maintaining consistent images of databases and enforcing access control. These server-to-server flows change in location and intensity over time, demanding a flexible approach to managing network resources.

To address these and other aspects of network performance and management, a technology known as the Software-Defined Network (SDN) has been developed. An SDN separates the data and control functions of networking devices, such as routers, packet switches, and LAN switches, with an Application Programming Interface (API) between the two.

Figure 1:
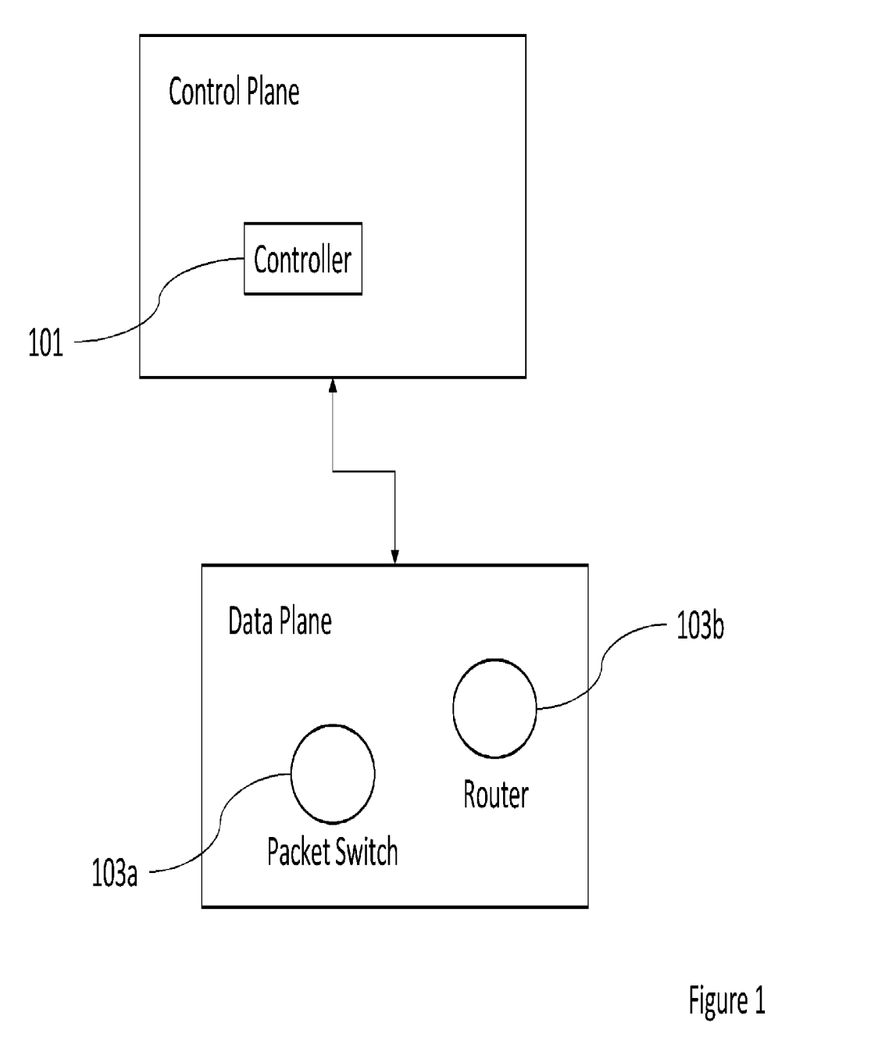
FIG. 1 is a schematic block diagram depicting a control plane and a data plane in a Software Defined Network (SDN)

FIG. 1 illustrates the logical structure of an SDN. A controller 101 is located in the control plane and can perform various complex functions, including routing, naming, policy declaration, and security checks. The controller 101 may define the packet flows that occur in the data plane, computing a route for a packet flow to take. The data plane includes a packet processor which classifies packets into flows using flow tables, whose entries can be populated by the controller, and processes the packets according to their flow. Communication between the controller and the data plane commonly uses a standardized protocol and API. The data plane may be programmable by the control plane via the API.

A known programmable data plane solution is OpenFlow™, which is a protocol between SDN controllers and network devices, as well as a specification of the logical structure of the network switch functions. OpenFlow is defined in the OpenFlow Switch Specification, published by the Open Networking Foundation (ONF).

Figure 2:
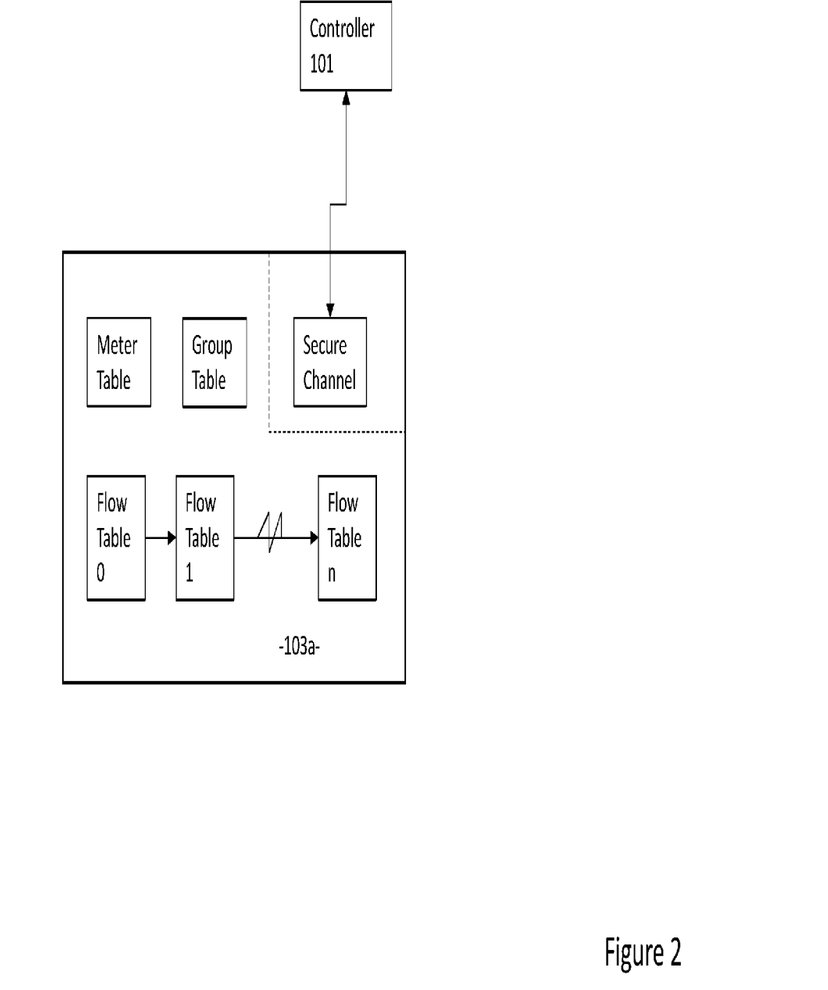
FIG. 2 is a schematic block diagram showing components of a known OpenFlow switch component forming part of the data plane of FIG. 1.

As shown in FIG. 2, in the OpenFlow architecture, controller 101 communicates with OpenFlow-compatible switches over a secure channel. Each switch can connect to other OpenFlow switches (not shown) and to end-user devices (not shown) that are the sources and destinations of packet flows.

Within each switch, a series of tables may be used to manage the flows of packets through the switch. The OpenFlow specification defines three types of tables in the logical switch architecture: flow tables, group tables and meter tables. A flow table matches incoming packets to a particular flow and specifies the functions that are to be performed on the packets. There may be multiple flow tables that operate in a pipeline fashion, as indicated schematically in FIG. 2. A flow table may direct a flow to a group table, which may trigger a variety of actions that affect one or more flows. A meter table can trigger a variety of performance-related actions on a flow. Each packet that enters a switch passes through one or more flow tables, and each flow table contains entries consisting of several components, including match fields (to determine packets that match the values in the fields); instructions (actions to be taken if a match occurs); priority (to determine relative priority of table entries), counters, timeouts and cookies.

The instructions component of a flow table entry consists of a set of instructions that are executed if the packet matches the entry. Actions describe packet forwarding, packet modification, and group table processing operations. If there is more than one flow table, they are organized as a pipeline, and the actions to be performed on the packets accumulate; the accumulated action set is executed and then the packet is queued for output.

Programmable data plane solutions can be divided into two types: code-driven and data-driven. Vector Packet Processing (VPP) is an example of the former, whilst OpenFlow, the P4 programming language and Open vSwitch (OVS) are examples of the latter. All of these known SDN technologies have limited flexibility as regards effecting changes to the processing of packets through the data plane.

SUMMARY

Aspects of the present disclosure provide systems, methods and computer software according to the appended claims.

In particular, a first aspect of the present disclosure provides a programmable packet data processing system comprising:

a reconfigurable packet processing component, the packet processing component when configured including packet processing nodes arranged in a graph structure such that a first packet processing node, after processing a packet, forwards the packet to a selected second node for further processing in accordance with the graph structure;

a graph configuration component, the graph configuration component providing an application programming interface for use by a controller component to configure the packet processing component to perform a set of predefined packet processing functions, wherein the graph configuration component is responsive to one or more requests, received from the controller component via the application programming interface, to reconfigure the packet processing component by controlling the presence of a node in the graph structure in accordance with a resource type in a set of predefined packet processing resource types.

By configuring nodes in the graph structure based on resource type, the graph configuration component is responsive to a first request relating to a given packet processing resource type to generate one or more corresponding second requests relating to one or more nodes the graph structure, wherein:

the first request comprises one or more of a create, read, update and delete request relating to a packet processing resource; and the one or more corresponding second requests each comprise one or more of a create, read, update and delete request relating to one or more nodes of the graph structure.

Since, in general, network applications involve configuration of a variety of packet processing resources, embodiments described herein provide a particularly scalable and efficient means of building packet processing systems for a range of network applications.

In one example, the graph configuration component is responsive to a first request to create a given packet processing resource type in the set of predefined packet processing resource types. The first request is received from the controller component via the application programming interface, and causes the graph configuration component to generate a plurality of second requests, and each respective one of said second requests is to at least one of create, read, update and delete a respective different node in the graph structure.

The nodes may comprise one or more match-action classifiers which apply one or more match-action rules in order to process a packet. By way of example, a given said match-action classifier is configurable to perform one or more of: packet validation; packet modification; packet multiplexing; and packet demultiplexing.

In this regard, in some examples, the graph configuration component is responsive to one or more requests received from the controller component via the application programming interface to reconfigure the packet processing component by creating a match-action classifier in accordance with a resource type A in the set of predefined packet processing resource types. Further, the graph configuration component may be responsive to one or more requests received from the controller component via the application programming interface to reconfigure the packet processing component by associating match-action data with the match-action classifier created in accordance with resource type A. The match-action data preferably comprises a unitary bitmask which is configurable to extract data bits from a plurality of different packet headers of a packet for the purposes of matching against values of packet header fields.

The packet data processing system may comprise a match-action table in which said match-action rules of one of said match-action classifiers are stored as match-action table entries. The graph configuration component is then responsive to one or more requests received from the controller component via the application programming interface to reconfigure the packet processing component by creating a match-action table entry in accordance with a resource type B in the set of predefined packet processing resource types.

In some embodiments, the controller component comprises a control plane packet processing function, and the packet processing nodes comprise: a control protocol packet classifier which applies one or more rules to forward a control protocol packet; and a control plane interface for receiving the forwarded control protocol packet and for transmitting the forwarded control protocol packet to the controller component. In these embodiments the packet processing nodes may comprise a user data packet classifier which applies one or more match-action rules in order to forward a user data packet, and the control protocol packet classifier is arranged to receive packets sent along a no-match path of the user data packet classifier.

In preferred arrangements, the programmable packet data processing system comprises a generator module adapted to output data for the graph configuration component based on a set of input parameters, which correspond to the aforementioned set of predefined packet processing resource types. In one example the set of input parameters are received in the form of a definition document which defines correspondences between application resources exposed on the application programming interface and the packet processing nodes in the graph structure. The output data can comprise computer code, which is compiled to generate the graph configuration component. Alternatively the output data can comprise code which is interpreted to generate the graph configuration component. As a further alternative the output data can comprise an application programming interface specification which is used by an application programming interface generator module to generate an additional application programming interface for use with the graph configuration component. For example, the application programming interface specification can comprise an OpenAPI specification.

In this way embodiments of the present disclosure provide a programmable data plane which can be programmed to perform a large range of different packet processing applications, including a mechanism for creating a processing application specific interface for dynamically configuring the data plane at run time.

Also provided is methods and computer readable medium, embodied as a Software Defined Network (SDN), which implement the programmable packet data processing system.

Further features and advantages described herein will become apparent from the following description of preferred embodiments, given by way of example only, which is made with reference to the accompanying drawings.

BRIEF DESCRIPTION OF THE DRAWINGS

In the Figures and accompanying description, parts and steps common between different embodiments are identified by the same reference numerals.

DETAILED DESCRIPTION OF CERTAIN INVENTIVE EMBODIMENTS

Embodiments described herein relate to a data-driven model for programming, and thus controlling, flows in the user planes. A flow may correspond to a network application, such as Skype™ or Netflix™ traffic. From the point of view of an individual component in the user plane, a flow is a sequence of packets that matches a specific set, or range, of header field values. The identification of a flow is packet-oriented, in the sense that it is a function of the values of header fields of the packets that constitute the flow. A flow may be identified by information from one or more header fields in a packet. The fields may be a tuple, for example a 5-tuple of information, which in the case of a UDP/IP packet or a TCP/IP packet may be made up of the protocol field (in the IP header), the source and destination IP addresses (again in the IP header) and source and destination ports if appropriate for the protocol (in the UDP or TCP header). A combination of flow entries on multiple switches and/or routers defines a flow, or service, that is bound to a specific path in a network and/or across networks.

Figure 3:
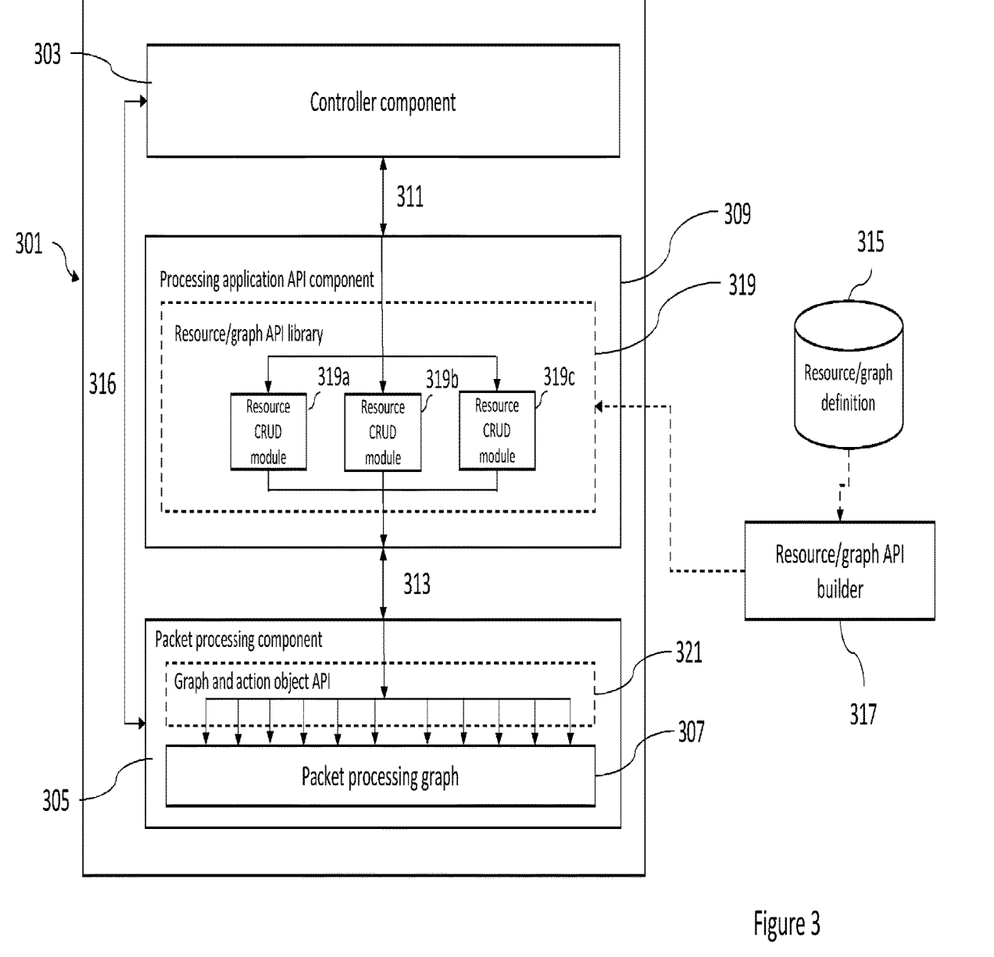
FIG. 3 is a schematic block diagram showing a programmable packet data processing system according to an embodiment of the present disclosure.

FIG. 3 shows a programmable packet data processing system 301 according to an embodiment of the present disclosure. The system 301 comprises a controller component 303, which is a control plane component that is processing application specific, and a packet processing component 305, which is a user plane component configured to process packets in accordance with the specific processing application, including receiving them from one or more network interfaces, modifying them as appropriate, and either discarding them or sending them to one more network interfaces for transmission. The packet processing component 305 executes in accordance with a packet processing graph 307, also referred to herein as a graph structure, which is a graph of packet processing nodes generally referred to as graph objects. Graph objects may be objects which form part of the structure of the graph such as the nodes (interfaces and classifiers) and edges (matches). Associated objects may be referenced from the graph to define specific actions (such as policers, rewrites, queues, action templates) associated with nodes and/or edges of the graph. These associated objects may be referred to as action objects.

The packet processing nodes are arranged such that a first packet processing node, after processing a packet in a flow, forwards the packet to a selected second node in the packet processing graph 307 for further processing in accordance with the structure of the graph.

Also shown in FIG. 3 is a graph configuration component, referred to herein as processing application API component 309, which is an application programming interface exposed on behalf of the packet processing component 305 for a particular processing application, such as a layer 2 switch, a layer 3 router, etc. The API provided by processing application API component 309 may be RESTful and is comprised of a set of operations to be performed on a set of application-specific resources, such as interfaces, switch forwarding tables and forwarding entries, or routing tables and individual routes. Application resources typically have a set of configuration parameters which are unique for each instance of the resource, and the operations that can be performed may include create, read, update and/or delete ("CRUD"). As shown, the controller component 303 sends application resource requests, specifying the above-mentioned operations to be performed by the processing application API component 309 via data connection 311. The processing application API component 309 in turn sends graph object and action object requests to the packet processing component 305 via data connection 313.

When the operations requested by the controller component 303 are linked to resources, as they are in the processing application API component 309, the specifics of how the resource requests map to graph objects can be specified separately in a definition, stored in the form of, for example, a data file, shown in FIG. 3 as graph definition 315.

The graph definition 315 comprises data describing the relationship between operations relating to application resources in the processing application API component 309 and operations relating to graph objects and action objects that implement those application resources. In particular, it defines how the graph objects should be created in the packet processing graph 307 for each instance of each application resource, and how the parameters on those graph objects correspond to configuration parameters on the application resources. A generator module, referred to herein as resource/graph builder 317, uses the graph definition 315 to generate code, which is compiled using standard compilation tools to create a set of resource CRUD modules (of which an exemplary set of three resource CRUD modules 319a, 319b, 319c are shown in FIG. 3) in the resource/graph API library 319. Each of the exemplary resource CRUD modules 319a, 319b, 319c relate to different resource types, for example resource type A, resource type B and resource type C respectively. The resource/graph API library 319 thus generated is programmed to perform at least one of create, read, update and/or delete the required graph objects in the packet processing graph 307, and the required associated action objects, for the particular processing application in response to corresponding create, read, update and/or delete application resource requests relating to a particular resource type (e.g. resource type A, resource type B, resource type C) issued by the controller component 303 to the processing application API component 309. The resource/graph API library 319 performs operations in relation to the required graph objects in the packet processing graph 307, and the required associated action objects, via the graph and action object API 321 of the packet processing component 305. Requests received from the controller component via the application programming interface to reconfigure the packet processing component by creating a match-action classifier in accordance with a resource type A in the set of predefined packet processing resource types. Such a created match-action classifier may be configured to perform one or more of:

packet validation;
packet modification;
packet multiplexing; and
packet demultiplexing.

The resource/graph API library 319 may be responsive to one or more requests received from the controller component 303 to reconfigure the packet processing component 305 by associating match-action data with the match-action classifier created in accordance with a particular resource type, for example resource type A. The match-action data may comprise a unitary bitmask which is configurable to extract data bits from a plurality of different packet header fields of a packet being processed a match-action classifier node in the graph 307. The unitary bitmask may be configurable to extract data bits, not just from a plurality of header fields, but from a plurality of different packet headers, for example from a Layer 2 header and a Layer 3 header of the packet, to be processed in a single pass by a match-action classifier node.

The graph definition 315 may optionally define control plane packet interfaces, allowing the controller component 303 to send and receive control packets to and from the user plane. In this case the packet data processing system 301 may include interface 316, which in one example is a Virtual Ethernet (vEth) interface.

As noted above, the graph objects making up the packet processing graph 307 are associated with an application resource type, for example interface, switch forwarding table, switch forwarding entry, routing table, route. In effect, the graph structure 307 is configured as a set of graph fragments, each corresponding to an application resource instance, which is created, read, updated and deleted via a respective resource CRUD module in the resource/graph API library. This provides a more flexible and scalable environment within which to build data plane solutions than is possible with known programmable data plane technologies.

Figure 4:
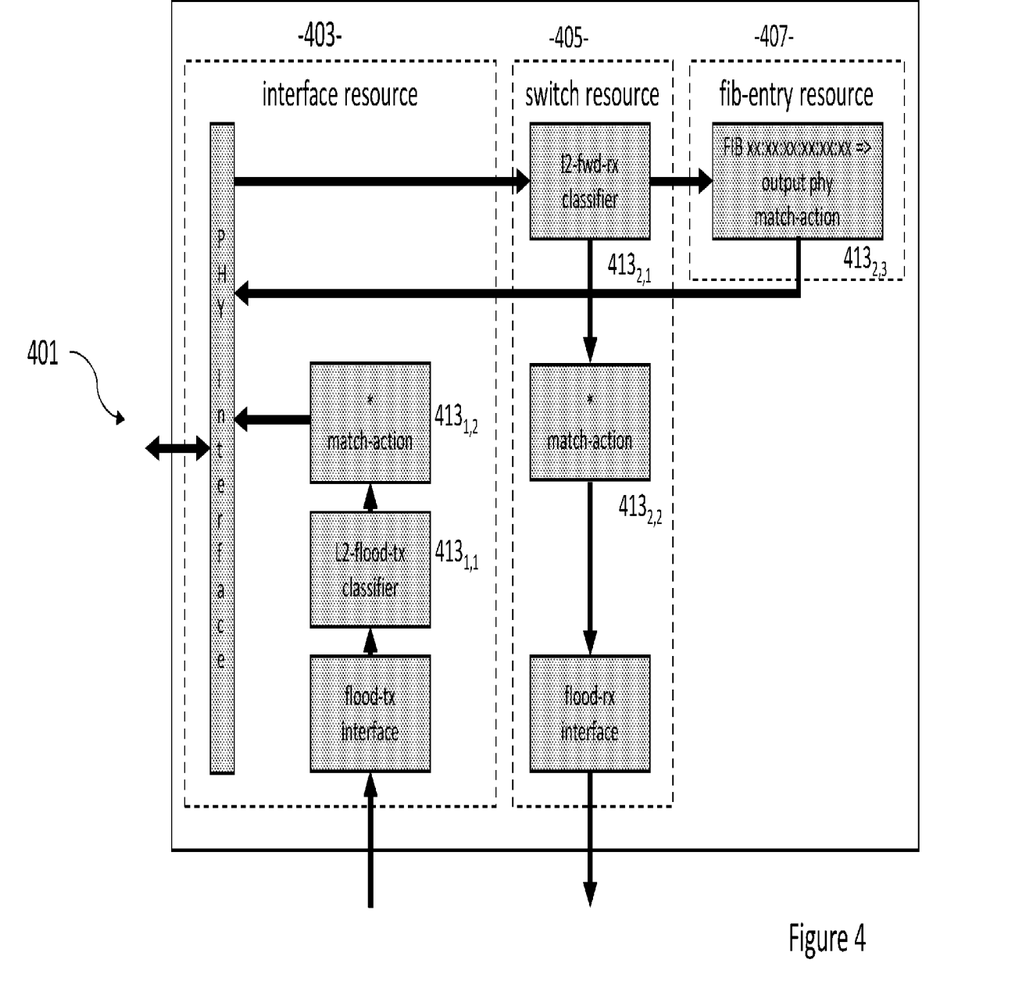
FIG. 4 is a schematic diagram depicting nodes of an exemplary packet processing graph generated in accordance with an embodiment of the present disclosure.

FIG. 4 shows the packet processing graph 401 for an example processing application, which is a basic layer 2 switch which uses a host interface to manage broadcasts and flooding. The graph includes graph fragments corresponding to respective interface 403, switch 405 and fib-entry 407 resource types.

A graph definition 315 can be specified in a graph definition file formatted according to a custom YAML schema. This schema is a human-readable data serialization language, and as an alternative, JSON, which is a subset of the JavaScript™ syntax, may be used. An exemplary graph definition 315 for the above-described layer 2 switch is as follows:

```
resources:
  switch:
    config:
      interface:
      - name: flood-rx
        type: host
      classifier:
      - name: 12-fwd-rx
        params:
                      dst_mac:
          headers:
                      ethernet:
                        dst: dst_mac
        match:
        - classifier: 12-fwd-rx
          name: "*"
          actions:
                      set:
                        $OUTPUT: flood-rx
  interface:
    config:
      binding:
      switch:
    graph:
      interface:
      -   name: phy
          type: phy
          binding: binding
          classifier: 12-fwd-rx
      -   name: flood-tx
```

```
          type: host
          classifier: 12-flood-tx
      classifier:
      -   name: 12-flood-tx
          headers:
      match:
      -   classifier: 12-flood-tx
          name: "*"
          action:
            set:
              $OUTPUT: phy
  fib_entry:
    config:
      output:
      dst_mac:
    graph:
      matches:
      -   classifier: 12-fwd-rx
          name: "FIB {{ config/dst_mac }} => {{ output }}"
          match:
              dst_mac: config/dst_mac
          action:
            set:
              $OUTPUT: "/interface/{{ output }}/interface/phy
```

Note that the graph definition only includes some of the available parameters, relating to selected header fields for the specific processing application to be generated. The graph definition 315 is interpreted by the resource/graph builder 317 and output as compiled code to be executed as the resource/graph API library 319. Pseudo-code for elements of an exemplary resource/graph API library 319 for the above-described layer 2 switch, as defined by the given exemplary graph definition, is as follows:

```
# switch resource API requests.
create_switch_resource (self)
    # Create the flood-rx host interface.
    self.if_flood_rx = new GraphHostInterface(name="flood-rx")
    # Create the 12-fwd-rx classifier.
    mask = new EthernetMask( ).add_dst_field( ).build( )
    self.classifier_12_fwd_rx - new GraphClassifier(name-"12-fwd-rx",
    mask-mask)
    # Add "*" match to 12-fwd-rx classifier.
    actions = [new GraphActionSet("$OUTPUT", self.if_flood_rx)]
    self.classifier_12_fwd_rx.add_match(name="*", match=None,
    actions=actions)
# interface resource API requests.
create_interface_resource(self, switch, binding)
    # Create the phy interface and bind it.
    self.if_phy = new GraphPhyInterface(name="phy", binding=binding)
    # Create the flood-tx interface.
    self.if_flood_tx = new GraphHostInterface(name="flood-tx")
    # Create the 12-flood-tx classifier.
    self.classifier_12_flood_tx - new GraphClassifier(name-"12-flood-tx",
    mask-None)
    # Add "*" match to 12-flood-tx classifier.
    actions = [new GraphActionSet("$OUTPUT", self.if_phy)]
    self.classifier_12_flood_tx.add_match(name="*", match=None,
    actions=actions)
    # Bind 12-fwd-rx classifier to phy interface.
    self.if_phy.bind_classifier(self.classifier_12_fwd_rx)
    # Bind 12-flood-tx classifier to flood interface.
    self.if_flood.bind_classifier(switch.classifier_12_flood_tx)
# fib_entry resource API requests
create_fib_entry_resource(self, switch, output, dst_mac)
    # Create a match in the 12-fwd-rx classifier.
    actions = [new GraphActionSet("$OUTPUT", output.if_phy)]
    switch.classifier_12_fwd_rx.add_match(name="FIB " + dst_mac +
    " => " + output,
    match={dst_mac=dst_mac},
    actions=actions)
```

When executed, the resource/graph API library 319 generates the graph structure of FIG. 4 by making the appropriate requests to the graph and action object API, to generate the packet processing graph 307 in the packet processing component 305. As can be seen, in this example the packet processing graph 307 comprises classifier object $413_{1,1}$ with companion match-action object $413_{1,2}$ both of which are associated with interface resource 403, and a classifier object $413_{2,1}$ with two companion match-action objects $413_{2,2}$, $413_{2,3}$, associated with switch resource 405 and fib-entry resource 407 respectively.

The graph definition 315 may optionally define control plane packet interfaces, allowing the application controller component 303 to send and receive control plane packets to and from the user plane. These interfaces may be transported over Linux Virtual Ethernet (vEth) interfaces between the controller component 303 and the packet processing component 305. The controller component 303 may comprise a control plane packet processing function, and the packet processing graph nodes may comprise:
- a control protocol packet classifier which applies one or more rules to forward a control protocol packet; and
- a control plane interface for receiving the forwarded control protocol packet and for transmitting the forwarded control protocol packet to the controller component 303.

The packet processing nodes may comprise a user data packet classifier which applies one or more match-action rules in order to forward a user data packet. The control protocol packet classifier may be arranged to receive packets sent along a no-match path of the user data packet classifier.

In their respective API requests, the resources, and in turn the nodes in the graph structure 307, may be referenced by unique URIs, where:
- the URI of a resource may be the type of the resource followed by the name of the resource instance;
- the URI of a graph object in the graph structure may be the URI of the resource that created the object, followed by the object type, followed by the name of the object from the graph definition;
- the URI of a match object may be the URI of the classifier followed by the name of the match from the graph definition.

The configuration and other attributes of each resource and each graph object may be accessible within the graph definition 315, also as URIs. For example:
- Configuration parameters may be accessible via a URI of the form <resource URI>/config/<parameter name>
- Graph object attributes may be accessible via a URI of the form <object URI>/<attribute name>

It is to be noted that URI references can be absolute or relative; in the latter case the base URI is the URI of the resource.

As described above, the graph objects making up the packet processing graph 307 may include objects which form the structure of the graph such as classifiers and interfaces (the nodes of the graph) and matches (the edges of the graph), and action objects referenced from the graph, such as rewrite objects, policer objects, and queue objects. Classifier objects may have a unique name, so they can be referenced by, and/or added to, different resources: this can be seen in the examples in FIG. 4, in which classifier node $413_{2,1}$, associated with switch resource 405, is referenced by match-action node $413_{2,3}$, associated with fib-entry resource 407. Classifier nodes can be defined as a stack of headers and fields of interest in those headers; header values may be specified by the classifier object itself (in which case all associated match objects implicitly inherit those values) or they may be bound to parameters of the classifier object, so that they can be specified separately for each match object.

Nodes in the graph structure 307 (classifiers and interfaces) may be linked by the directed edges (matches) of the packet processing graph 307. As will be appreciated from the foregoing, each match object (e.g. $413_{1,2}$) originates at a classifier object (e.g. $413_{1,1}$). Match objects may point to another classifier object or may be a terminating match, in which case a packet is either dropped or output via an interface (e.g. $413_{1,2}$) as indicated in the packet metadata. Match objects may define a set of one or more actions to be performed on a packet in a flow, including simple or complex packet modifications, and adding or updating packet metadata. Some simple actions may be encoded directly in the match object; other actions may reference other objects, such as rewrite objects (for complex packet modifications) and policer objects or queue objects for traffic metering, policing and shaping.

Interface objects are the ingress and/or egress points of packets into the packet processing graph 307. Packets received on an interface may be passed to a single root classifier bound to the interface. Packets may be output on the interface set in the special $OUTPUT packet metadata when there are no more classifiers to process the packet. Interface objects may be statically bound to physical or virtual ports, or may be dynamically created in the case of control plane interface.

Rewrite objects may be referenced by match objects to perform complex packet manipulations such as adding headers or modifying header fields. Rewrite objects may be maintained as separate objects to allow multiple match objects to reference the same rewrite object when appropriate—both for efficiency and to allow for atomic updates to apply to multiple matches (for example, if multiple VLANs are multiplexed over a single tunnel, all the VLAN matches can reference the same tunnel rewrite object so the tunnel endpoint can be changed with a single operation).

Non-Limiting Additional Implementation Details

Although at least some aspects of the embodiments described herein with reference to the drawings comprise computer processes e.g. in the form of processing systems, agents or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chip set, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The graph data structure may be optimised using an approach as described in applicant's co-filed patent application entitled "Generating packet processing graphs", filed on even date with the subject application, the contents of which are incorporated herein by reference. Many different kinds and structures of packet processing graphs may be implemented, including those examples described in applicant's co-filed patent application entitled "Packet processing graphs", filed on even date with the subject application, the contents of which are incorporated herein by reference.

The above embodiments are to be understood as illustrative examples of the invention. Further embodiments of the invention are envisaged.

For example, in the embodiments described above the resource/graph builder 317 uses the graph definition 315 to create code which is then compiled to create the API library 319. In alternative embodiments, the resource/graph builder 317 may create code which is executed by an interpreter such as a Java Virtual Machine (JVM) or a Python interpreter. In other embodiments, the resource/graph builder 317 may emit intermediate data structures which are used by a generic resource/graph API library to create the processing application specific API at run time.

In the embodiments described above the packet processing graph uses a data-driven match-action classifier graph to define the processing to be performed on each packet. As regards the classifier objects themselves, these can be implemented using match-action classifier objects from existing packet processing architectures such as VPP and Open vSwitch, or modified versions thereof.

The matching logic utilised by the classifier nodes is preferably one of the following types:
  Exact match. Entries in a match-action table are searched for an exact match to selected parts of an incoming packet's header data, e.g. after a unitary bitmask associated with the classifier has been applied, to determine an action specified in the table entry.
  Range match. Entries in a match-action table specify a range of matches, e.g. a match based upon port range, to selected parts of an incoming packet's header data, e.g. after a unitary bitmask associated with the classifier has been applied, to determine an action specified in the table entry.
  Longest-prefix match. A match is identified from a e.g. a forwarding table. Each entry in the forwarding table may specify a sub-network, and one destination address may match more than one forwarding table entry. The most specific of the match-action table entries—the one with the longest subnet mask is called the longest prefix match. Match-action table entries specify prefixes with which to match selected parts of an incoming packet's header data, e.g. after a unitary bitmask associated with the classifier has been applied, to determine an action specified in the table entry.
  Bloom filter match. A probabilistic match based upon specified criteria; this can be advantageous if the number of potential matches is particularly large. Match-action table entries specify a criteria with which to match selected parts of an incoming packet's header data, e.g. after a unitary bitmask associated with the classifier has been applied, to determine an action specified in the table entry.
  Regular expression ("Regex") match. Match-action table entries specify a regular expression match to selected parts of an incoming packet's header data, e.g. after a unitary bitmask associated with the classifier has been applied, to determine an action specified in the table entry.

As noted above, associated objects may be referenced from the graph to define specific actions associated with nodes and/or edges of the graph. In addition to the examples listed above (policers, rewrites, queues, action templates), action objects can include any of those listed in conjunction with the actions=[action][,action . . . ] part of the Open vSwitch Manual, which is available at http://www.openvswitch.org/support/dist-docs/ovs-ofctl.8.txt. For ease of reference, these include e.g. controller actions (sends the packet and its metadata to the controller component 303 as a "packet in" message) and flood actions (outputs a packet on all switch physical ports other than the port on which the packet was received). It is to be understood that this is not an exhaustive list and that embodiments apply to other and indeed future actions.

The packet processing component may be implemented using the known Data Plane Development Kit (DPDK), creating a high-performance programmable packet processing system in which graph objects corresponding to physical interface resources have a binding to the appropriate DPDK physical interfaces over which packets can be transmitted.

Whilst the above examples describe a data-driven graph structure, alternative embodiments may use a different graph structure, such as a code-driven graph as used by systems such as VPP, Click Modular Router or Berkeley Extensible Software Switch (BESS) where the graph defines interconnections between a set of different code modules each of which is capable of performing certain operations on the packets.

Figure 5:
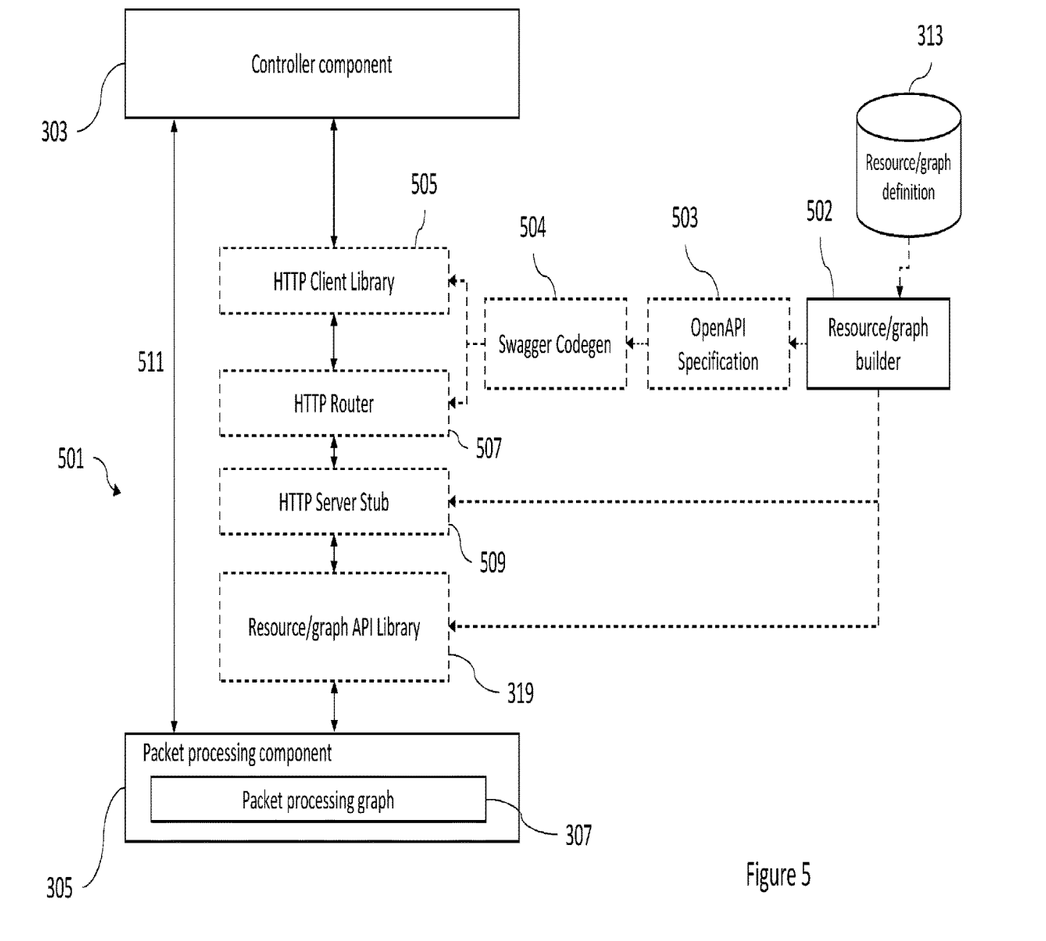
FIG. 5 is a schematic block diagram showing a programmable packet data processing system according to an alternative implementation.

Also, in the examples described above, it is assumed that the user plane is to be used with a local control plane, such as may be the case when e.g. the controller component 303 runs on the same virtual machine as the packet processing component 305. FIG. 5 shows an alternative implementation of programmable packet data processing 501, one in which the controller component 303 is remote from the user plane. In this implementation a resource/graph builder 502 generates the following components:
  the resource/graph API library 319;
  an OpenAPI specification 503 for a RESTful HTTP API, which can be used by Swagger Codegen 504 to create an additional API, including HTTP client library 505 and an HTTP router 507, for use with the resource/graph API library 319;
  an HTTP server stub 509 which maps the stub interface expected by the HTTP Router 507 to the API exposed by the resource/graph API library 319.

The graph definition 315 may define control plane packet interfaces to pass control plane packets between the user plane and the controller code. In this case, these packets may be carried over a packet network connection between the data plane component(s) and the control plane component(s) in an L2 tunnel 511 or alternative overlay network technology.

Other implementations are possible, for example, embodiments can integrate with a packet processing function defined in an existing P4 Runtime control plane application. In this implementation, a P4 compiler may auto-generate a graph definition file that is to be used by the resource/graph builder 317. The compilation step also produces a P4 Runtime Server which interfaces directly to a resource/graph API library 319 generated by the resource/graph builder 317, allowing the existing P4 Runtime control plane application to control the user plane. As a further refinement, an optional traffic profile may be input to the P4 compiler, to configure the resource/graph API library 319 for improved performance in relation to an expected traffic pattern.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system comprising a processor and a memory storing computer executable instructions that, when executed by the processor, cause the system to perform operations comprising:
   loading a packet processing component into the memory, the packet processing component comprising a plurality of packet processing nodes arranged in a graph structure, the plurality of packet processing nodes configured to process and forward packets of a communications network in accordance with the graph structure;
   while the packet processing component is executing to process and forward packets of the communications network in accordance with the graph structure, receiving, via an application programming interface, a request to configure the packet processing component to perform a predefined packet processing function according to a predefined packet processing resource type of the graph structure; and
   in response to the request, reconfiguring, during run time in a data plane of the communications network, one or more packet processing nodes in the graph structure to perform the predefined packet processing function based on the predefined packet processing resource type; wherein the reconfigured packet processing nodes comprise one or more match-action classifiers which are arranged to apply one or more match-action rules in order to process a packet of the communications network, and wherein the reconfiguring comprises modifying one of the match-action rules or adding a match-action rule.

2. The system of claim 1, wherein the request is a first request, further comprising computer executable instructions that, when executed by the processor, cause the system to perform operations comprising:
   responsive to a second request to create a specified packet processing resource type, the second request received via the application programming interface, generating a plurality of third requests, each of the third requests being at least one of create, update or delete a respective packet processing node in the graph structure.

3. The system of claim 1, wherein the match-action classifier is generated in accordance with a first resource type.

4. The system of claim 3, wherein match-action data is associated with the match-action classifier created in accordance with the first resource type.

5. The system of claim 4, wherein the match-action data comprises a unitary bitmask which is operable to extract the data bits.

6. The system of claim 1, further comprising a match-action table in which the match-action rules of one of the one or more match-action classifiers are stored as match-action table entries, further comprising computer executable instructions that, when executed by the processor, cause the system to perform operations comprising:
   responsive to one or more requests received via the application programming interface, reconfiguring the packet processing component by creating a match-action table entry in accordance with a resource type B.

7. The system of claim 1, wherein the match-action classifiers are usable to perform one or more of:
   packet validation;
   packet modification;
   packet multiplexing; or
   packet demultiplexing.

8. The system of claim 1, wherein the packet processing nodes comprise a user data packet classifier operable to apply the one or more match-action rules to forward a user data packet, and wherein the user data packet classifier is operable to receive packets sent along a no-match path of the user data packet classifier.

9. The system of claim 1, further comprising computer executable instructions that, when executed by the processor, cause the system to perform operations comprising:
   generating output data based on a set of input parameters, the input parameters corresponding to the predefined packet processing resource type.

10. The system of claim 9, wherein the set of input parameters are received as a definition document which defines correspondences between application resources exposed on the application programming interface and the packet processing nodes in the graph structure.

11. The system of claim 9, wherein the output data comprises code which is compiled to generate a graph configuration component.

12. The system of claim 11, wherein the output data comprises code which is interpreted to generate a graph configuration component.

13. The system of claim 9, wherein the output data comprises data structures which are usable to control a generic graph configuration component.

14. The system of claim 9, wherein the output data comprises an application programming interface specification which is used to generate an additional application programming interface for use with a graph configuration component.

15. The system of claim 14, wherein the application programming interface specification comprises an OpenAPI specification.

16. A method for reconfiguring a packet data processing system during run time in a communications network, the packet data processing system comprising a packet processing component and a graph configuration component executing in a data plane of the communications network, the method comprising:
   loading, by the packet data processing system, the packet processing component into a memory of the packet data processing system, the packet processing component comprising a plurality of packet processing nodes arranged in a graph structure, the plurality of packet processing nodes configured to process and forward packets of the communications network in accordance with the graph structure;
   while the packet processing component is executing to process and forward packets of the communications network in accordance with the graph structure, receiving, by the graph configuration component via an application programming interface, a request to configure the packet processing component to perform a predefined packet processing function according to a predefined packet processing resource type of the graph structure; and in response to the request, reconfiguring, during run time by the graph configuration component in the data plane, one or more packet processing nodes in the graph structure to perform the predefined packet processing function based on the predefined packet processing resource type; wherein the reconfigured packet processing nodes comprise one or more match-action classifiers which are arranged to apply one or more match-action rules in order to process a packet of the communications network, and wherein the reconfiguring comprises modifying one of the match-action rules or adding a match-action rule.

17. The method of claim 16, wherein the request is a first request, further comprising responsive to a second request to create a specified packet processing resource type, the second request received via the application programming interface, generating a plurality of third requests, each of the third requests being at least one of create, update or delete a respective packet processing node in the graph structure.

18. The method of claim 16, wherein the match-action classifiers are usable to perform one or more of:
    packet validation;
    packet modification;
    packet multiplexing; or
    packet demultiplexing.

19. A non-transitory computer-readable storage medium having computer-executable instructions stored thereupon which, when executed by one or more processors of a computing device, cause the computing device to:

load a packet processing component comprising a plurality of packet processing nodes arranged in a graph structure, the plurality of packet processing nodes configured to process and forward packets of a communications network in accordance with the graph structure;

receiving, via an application programming interface, a request to configure the packet processing component to perform a predefined packet processing function according to a predefined packet processing resource type of the graph structure; and in response to the request, reconfiguring, during run time in a data plane of the communications network, one or more packet processing nodes in the graph structure to perform the predefined packet processing function based on the predefined packet processing resource type; wherein the reconfigured packet processing nodes comprise one or more match-action classifiers which are arranged to apply one or more match-action rules in order to process a packet of the communications network, and wherein the reconfiguring comprises modifying one of the match-action rules or adding a match-action rule.

20. The non-transitory computer-readable storage medium of claim 19, wherein the request is a first request, further comprising responsive to a second request to create a specified packet processing resource type, the second request received via the application programming interface, generating a plurality of third requests, each of the third requests being at least one of create, update or delete a respective packet processing node in the graph structure.

* * * * *